United States Patent
Kang

(10) Patent No.: US 7,093,114 B2
(45) Date of Patent: Aug. 15, 2006

(54) MICROCOMPUTER SUPPORTING PLURALITY OF SYSTEMS UTILIZING A SINGLE KEYBOARD BIOS

(75) Inventor: Seong Cheol Kang, Osan-si (KR)

(73) Assignee: LG Electronics Inc., Seoul (KR)

( * ) Notice: Subject to any disclaimer, the term of this patent is extended or adjusted under 35 U.S.C. 154(b) by 438 days.

(21) Appl. No.: 10/303,879

(22) Filed: Nov. 26, 2002

(65) Prior Publication Data

US 2003/0145135 A1    Jul. 31, 2003

(30) Foreign Application Priority Data

Jan. 28, 2002    (KR) .................. 10-2002-0004874

(51) Int. Cl.
*G06F 9/24* (2006.01)
*G06F 15/177* (2006.01)

(52) U.S. Cl. .............................. 713/1; 713/2
(58) Field of Classification Search ............ 713/1, 713/202, 201; 710/14; 345/168
See application file for complete search history.

(56) References Cited

U.S. PATENT DOCUMENTS

| | | | |
|---|---|---|---|
| 5,537,544 A * | 7/1996 | Morisawa et al. | 713/202 |
| 6,421,782 B1 * | 7/2002 | Yanagisawa et al. | 713/201 |
| 6,487,612 B1 * | 11/2002 | Sueyoshi et al. | 710/14 |
| 6,515,653 B1 * | 2/2003 | Kao et al. | 345/168 |

\* cited by examiner

*Primary Examiner*—Lynne H. Browne
*Assistant Examiner*—Stefan Stoynov
(74) *Attorney, Agent, or Firm*—Fleshner & Kim, LLP

(57) ABSTRACT

A microcomputer and method for same can contain a nonvolatile memory module and store information regarding various system models in the memory module to support the various system models by one keyboard BIOS. Functions preset in the microcomputer, which includes a keyboard controller are not removed even though system voltages are removed so the preset functions are maintained. Preferably, the microcomputer includes a nonvolatile memory module for storing desired, prestored information even when system voltages are removed, and a keyboard controller module for performing control operations of a keyboard with a keyboard basic input/output system (BIOS). The desired information can include function information set by a user, current status information, and design selection information for designing the keyboard BIOS appropriately to an applied system.

26 Claims, 5 Drawing Sheets

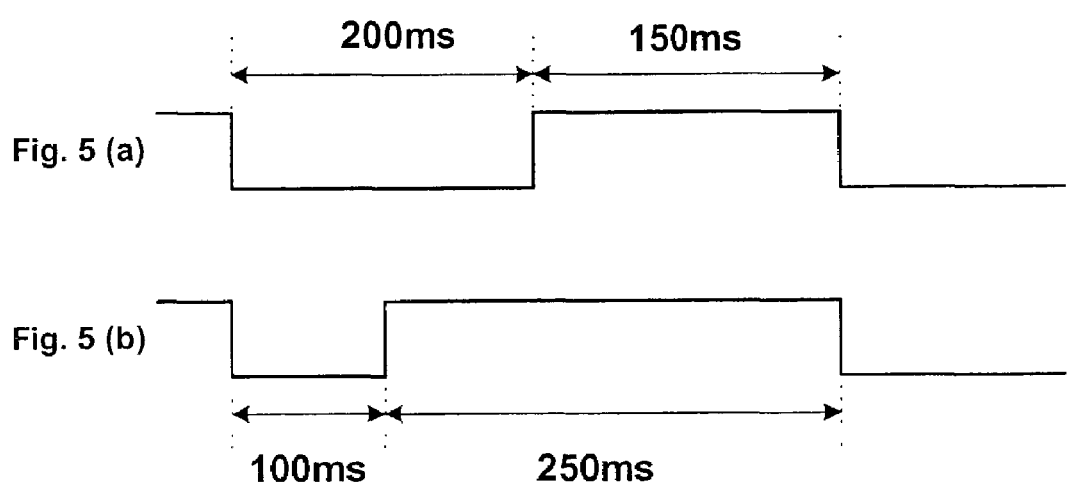

MICROCOMPUTER SUPPORTING PLURALITY OF SYSTEMS UTILIZING A SINGLE KEYBOARD BIOS

BACKGROUND OF THE INVENTION

1. Field of the Invention

The present invention relates to a microcomputer.

2. Background of the Related Art

A related art portable computer includes a keyboard controller and is operated in different manners according to system models and is configured to support a variety of functions. For example, for a first computer model type, the keyboard controller (microcomputer) performs a power-on/off detection function at a input/output pin. For a second computer model type, the keyboard controller performs a Wake-up Ring (WR) function at the same pin. Thus, the related art basic input output system (BIOS) for the keyboard controller must be designed and modified for application of the keyboard controller to each computer model, and there is a problem in that one keyboard BIOS cannot be applied to various models.

If a user sets the functions (e.g., Save To Disk (STD) or WR) in the related art system, the settings are temporarily stored in the keyboard controller (microcomputer). However, if system power is removed, the keyboard controller is reset thereby causing an the functions stored in the microcomputer to be removed. Thus, there is a problem that without power, the microcomputer keyboard controller cannot support such functions at all.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

The present invention generally reduces or solves the above-described problems in a whole or in part. The present invention can provide a microcomputer that contains a nonvolatile memory module and stores information regarding various system models in the memory module to support the various system models by one keyboard BIOS. The present invention can provide a microcomputer where preset functions are retained or continuously maintained and not lost even though system voltages are removed.

To achieve at least the above objects and other advantages in a whole or in part and in accordance with the purpose of the present invention, as embodied and broadly described herein, there is provided a portable computer that includes a system including a CPU, a microcomputer coupled to the system by a first interface, wherein the microcomputer includes a nonvolatile memory module that stores prescribed information, and a keyboard controller module that controls a keyboard using a keyboard basic input/output system (BIOS), wherein the keyboard controller is connected to the nonvolatile memory module by a second interface, and a third interface that connects the system to the nonvolatile memory module in the microcomputer.

To further achieve at least the above objects and other advantages in a whole or in part and in accordance with the purpose of the present invention, as embodied and broadly described herein, there is provided a microcomputer that includes a nonvolatile memory module that includes pre-stored information, and a keyboard controller module that performs a control operation of a keyboard with a keyboard basic input/output system (BIOS).

To further achieve at least the above objects and other advantages in a whole or in part and in accordance with the purpose of the present invention, as embodied and broadly described herein, there is provided a method of assembling a notebook computer that includes providing a system with a first microcomputer, a system memory and a main chipset, providing a keyboard controller with a nonvolatile memory module and a keyboard controller module storing a keyboard basic input output system, connecting the system to the nonvolatile memory module, connecting the system to the keyboard controller module, and storing prescribed information that includes function information set by user and current status information in the nonvolatile memory module, wherein the prescribed information is accessible using the keyboard controller module when system voltages are removed.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 5a and 5b are waveform diagrams of exemplary signals based on different modes set in a microcomputer of FIG. 3 according to the present invention.

DETAILED DESCRIPTION OF PREFERRED EMBODIMENTS

Figure 1:
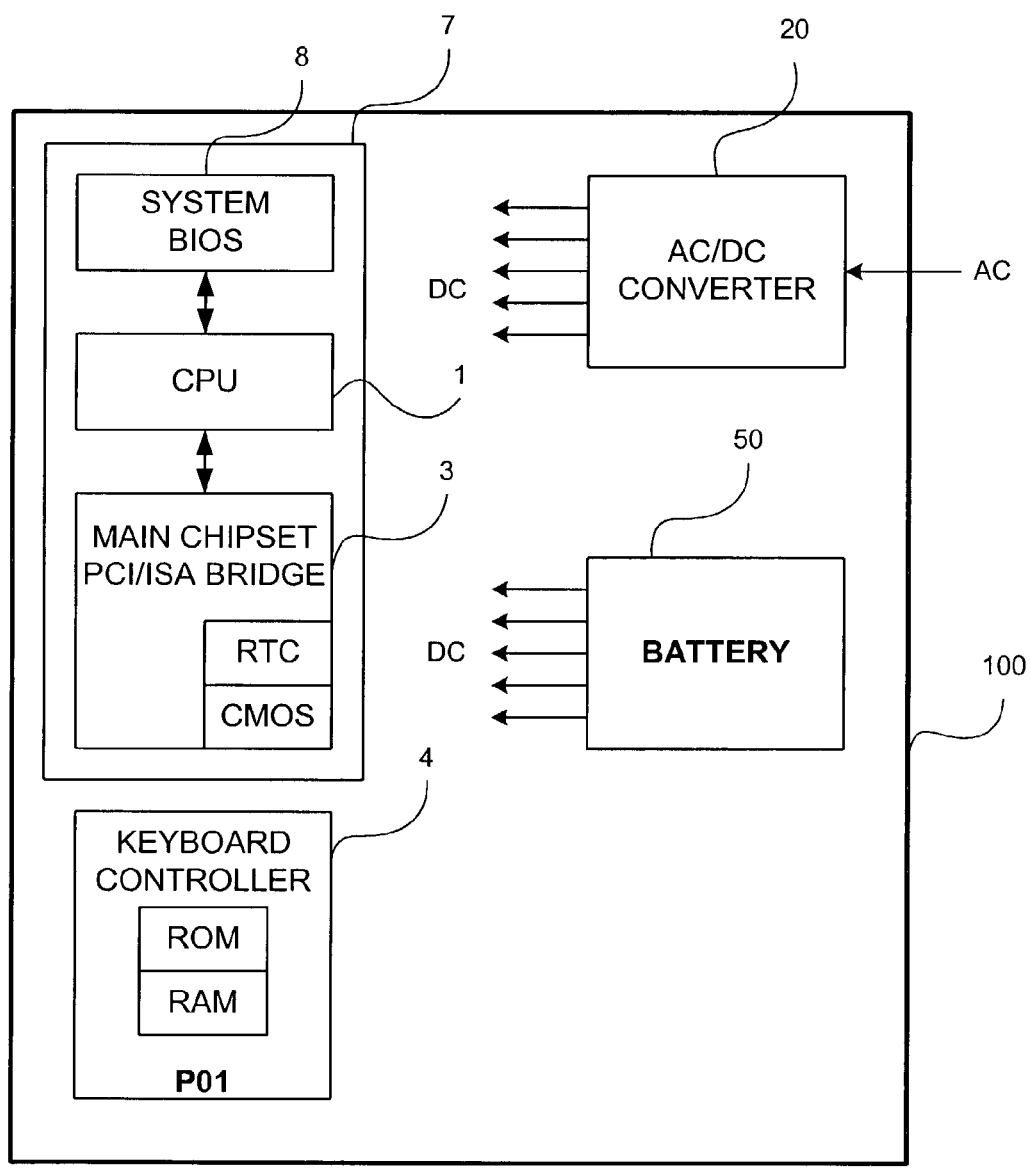
FIG. 1 is a block diagram schematically showing a circuit construction of a computer system.
Figure 2:
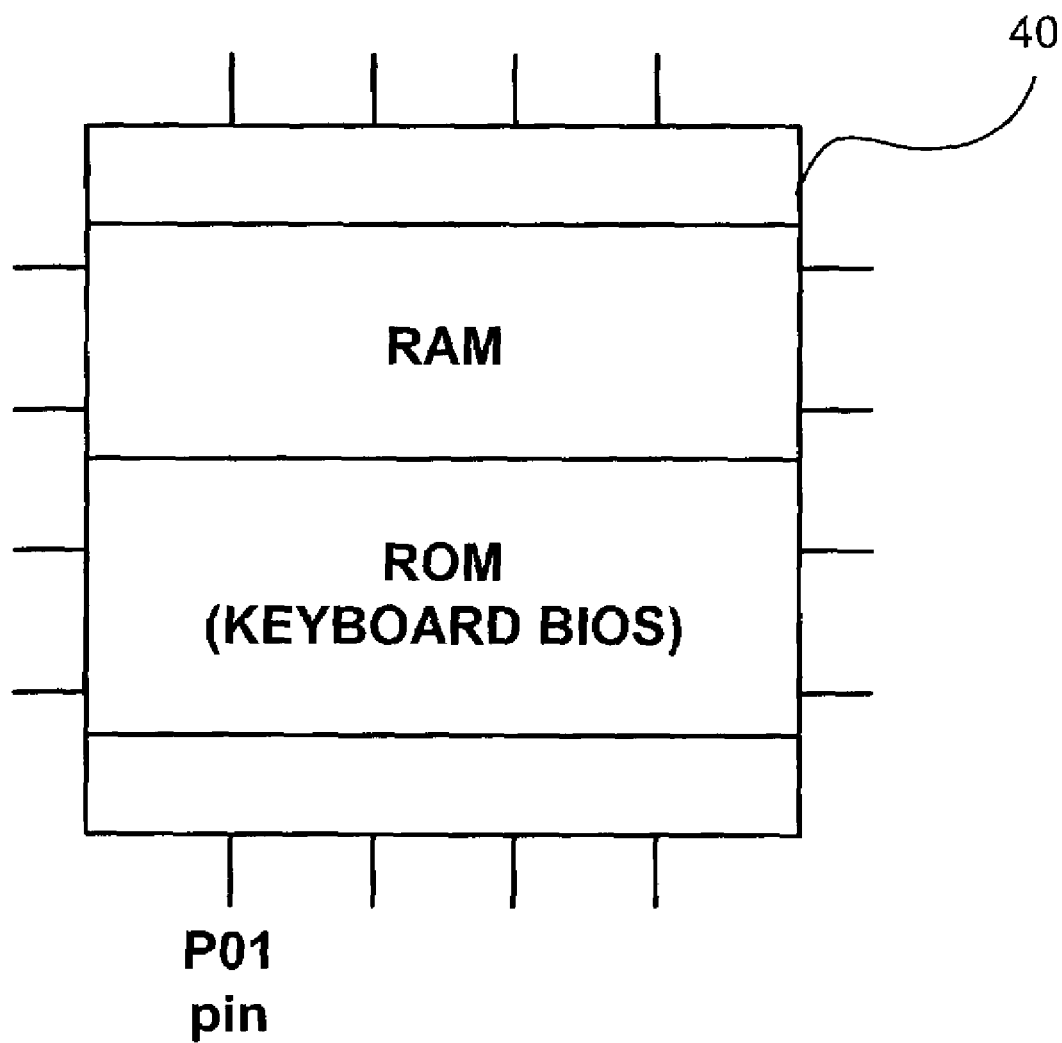
FIG. 2 is a view showing a memory structure of a microcomputer in the computer system of FIG. 1.

FIG. 1 is a block diagram that shows a circuit configuration of a general portable system (for example, a notebook computer or the like) that has a microcomputer (keyboard controller). As shown in FIG. 1, a portable system 100 can include a microcomputer (keyboard controller) 4, a main chipset 3, a central processing unit (CPU) 1, a system read-only memory (ROM) 8 in which a system basic input output system (BIOS) program and the associated application programs can be stored, a system battery 50 and an alternating current (AC)/direct current (DC) converter 20. A system 7 can include the CPU 1, the main chipset 3 and the system ROM (BIOS) 8. In the portable system 100, the main chipset 3 can include a real time clock (RTC)/complementary metal-oxide semiconductor (CMOS)-type nonvolatile memory module, which is limitedly used only for hardware functions of the main chipset 3. The microcomputer 4 contains a random access memory (RAM) and a read only memory (ROM). As shown in FIG. 2, a keyboard basic input/output system (BIOS) can be stored in the ROM.

As shown in FIG. 1, the microcomputer 4 can operate in different manners according to system models. For example, for a model A, the microcomputer 4 performs a power-on/off detection function at its pin P01, which is shown in FIG. 2. For a model B, the microcomputer 4 performs a Wake-up Ring (WR) function at its pin P01. Thus, the keyboard BIOS in the microcomputer 4 cannot be applied to various models.

Further, as shown in FIG. 1, the microcomputer 4 is configured to support a variety of functions, a Save To Disk (STD) function, a Save To RAM (STR) function, a Wake-up On LAN (WOL) function, a Wake-up Ring (WR) function, etc. When a user sets the preset functions (the STD function, STR function, WOL function, WR function, etc.) in the microcomputer 4, the settings are stored in the internal RAM area. If system voltages (e.g., an input voltage to the AC/DC converter 20 and an output voltage from the system battery 50) are removed, the microcomputer 4 is reset. Accordingly, the functions stored in the RAM area of the microcomputer 4 are lost. That is, upon removal of the system voltages, the microcomputer 4 cannot support the preset functions.

Figure 3:
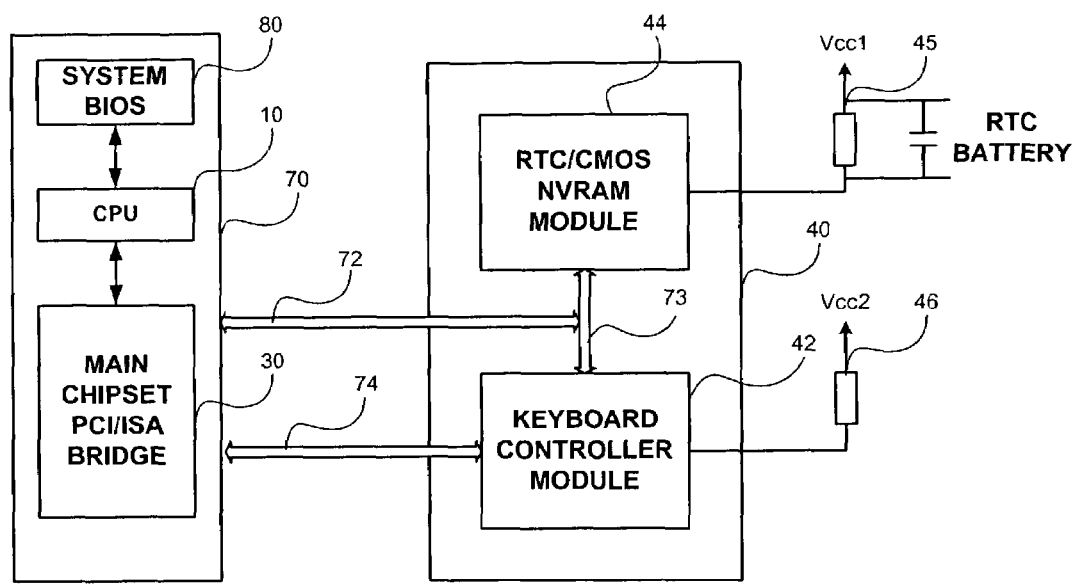
FIG. 3 is a block diagram illustrating a preferred embodiment of a computer system according to the present invention.

FIG. 3 is a block diagram illustrating a preferred embodiment of a computer system according to the present invention including relationships between a microcomputer and peripheral circuit blocks. As shown in FIG. 3, a system 70 can include a central processing unit (CPU) 10, a system ROM 80 similar to such elements shown in FIG. 1. The BIOS program and the associated application programs are preferably stored in the system ROM 80. The system 70 can also include a main chip set 30. A microcomputer 40 preferably contains a nonvolatile memory module 44 and a keyboard controller module 42.

The system 70 and the microcomputer 40 are preferably coupled via two interfaces 72 and 74. The nonvolatile memory module 44 can be an RTC/CMOS type and is applied with an RTC/CMOS battery voltage (e.g., a voltage of about 2.5V semi-permanently generated) 45. The keyboard controller module 42 is applied with the battery voltage 45 or a DC system voltage 46 from an AC/DC converter (not shown).

Preferably stored in the RTC/CMOS nonvolatile memory module 44 are information regarding the current state (for example, a wake-up time, wake-up source or etc.) of the microcomputer 40 and information regarding functions (for example, an STD function, WOL function, STR function, WR function, etc.) set in the keyboard controller module 42. Also, design selection information capable of modifying and designing a keyboard BIOS appropriately to various system models can be stored in the RTC/CMOS nonvolatile memory module 44. Table 1 shows an example of such design selection information.

TABLE 1

| MODEL ID | TERMINAL (Pin) | FUNCTION |
| --- | --- | --- |
| Model 1 | P01 | Power-On/Off Detection |
| Model 2 | P01 | Wake-up Ring |
| . . . | . . . | . . . |

In addition, the microcomputer 40 can use different pulses according to applied system models. The different pulses preferably have the same pulse period, but different shapes, as shown in FIGS. 5a and 5b. The exemplary pulse of FIG. 5a has a low level width of 200 ms and a high level width of 150 ms, and the exemplary pulse of FIG. 5b has a low level width of 100 ms and a high level width of 250 ms. Such information about types of pulses to be utilized corresponding to applicable system models (e.g., high level pulse width information and low level pulse width information) can be included in the design selection information and stored in the RTC/CMOS nonvolatile memory module 44.

Figure 4:
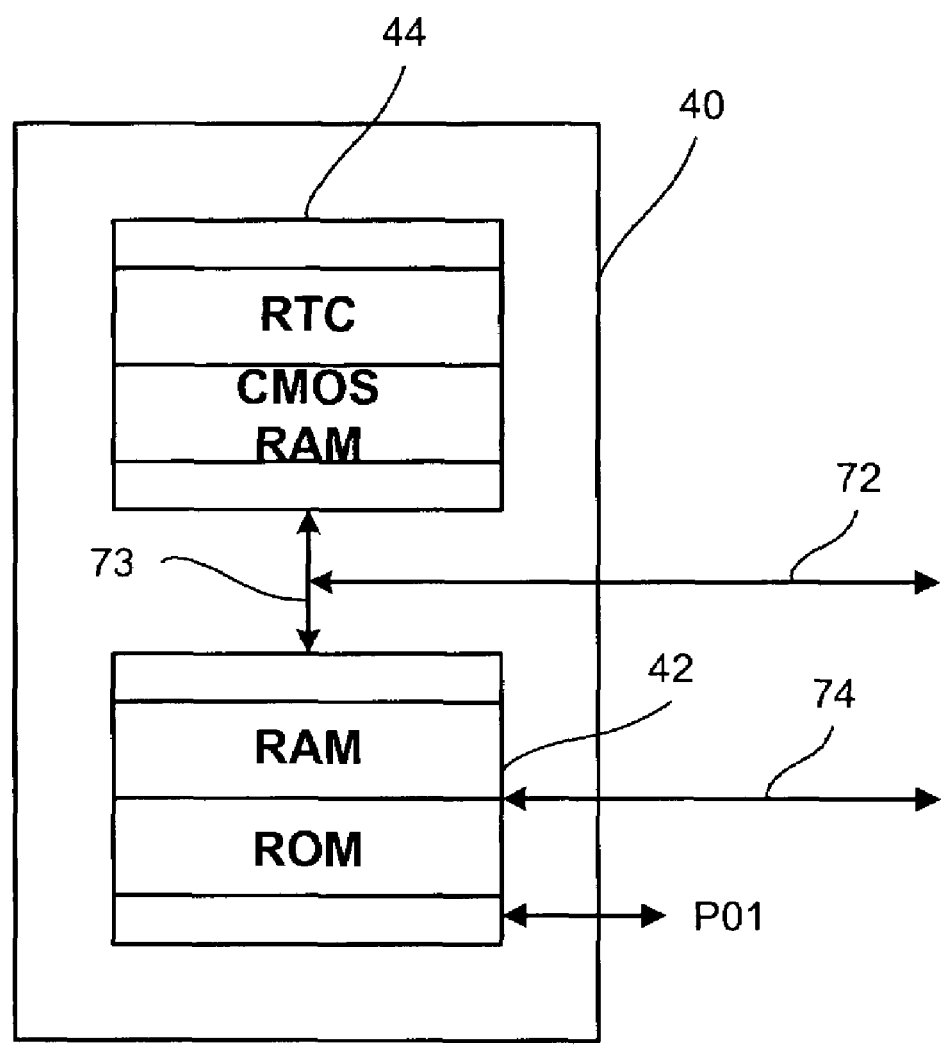
FIG. 4 is a view showing an exemplary memory structure of a microcomputer of FIG. 3 according to the present invention.

As shown in FIGS. 3 and 4, the interfaces 72 and 74 between the system 70 and the microcomputer 40 can be an RTC/CMOS interface and a keyboard controller interface, respectively. The RTC/CMOS interface 72 can be used to transfer a data read/write signal from the system 70 to the RTC/CMOS nonvolatile memory module 44 of the microcomputer 40. An interface 73 between the keyboard controller module 42 and the RTC/CMOS nonvolatile memory module 44 can be an internal interface for allowing the keyboard controller module 42 to read/write data from/into the RTC/CMOS nonvolatile memory module 44 while the system 70 does not use the RTC/CMOS interface 72.

On the other hand, the system BIOS program or the associated application programs stored in the system ROM 80 of the system 70 enables the keyboard controller module 42 in use to perform a different function preferably by modifying data contents stored in a specific location of the RTC/CMOS nonvolatile memory module 44 through the RTC/CMOS interface 72.

For example, information regarding types of pulses shaped to have the same pulse period, but different high level widths and different low level widths (e.g., as shown in FIGS. 5a and 5b) may be used as the design selection information in the RTC/CMOS nonvolatile memory module 44. In this case, if the system BIOS program or the associated application programs stored in the system ROM 80 of the system 70 modifies a value, preferably stored in a specific location of the RTC/CMOS nonvolatile memory module 44 to define the operation of a pin P01 of the keyboard controller module 42, the keyboard BIOS of the keyboard controller module 42 can read the modified value from the RTC/CMOS nonvolatile memory module 44 via the interface 73 between the module 42 and the module 44. The keyboard BIOS then changes the current pulse type at the pin P01 to a desired pulse type, for example, from that of FIG. 5a to that of FIG. 5b or vice versa according to the contents modified by the system. In this manner, for example, an increment of a sound volume of a speaker mounted to a computer system preferably can be varied using one keyboard BIOS since the system model on the basis of the model ID information is changed.

Using the design selection information, a pulse adjustment of the sound volume level can be made during run-time of the system. For example, when a volume-up key or a volume-down key is operated once for sound volume adjustment through a keyboard, a pulse of a different type may be outputted to vary an increment or a decrement of a sound volume of the speaker mounted to the computer system.

Therefore, a user can adjust a pulse width of the sound volume level generated for the increment or the decrement of the sound volume when the volume-up key or the volume-down key is operated once. For example, if user set the pulse width of the sound volume level to change from 150 msec into 200 msec under the condition that a menu, in which the user can adjust the pulse width, is provided in the BIOS setup menu window of a power-on self-test (POST) operation, the sound volume level can be made higher corresponding to the increased amount of the pulse width every time the volume-up key is operated. Similarly, while the sound volume level can be made lower corresponding to the increased amount of the pulse width each time the volume-down key is operated.

On the other hand, the pulse width of the sound volume level may be adjusted utilizing an application program, stored in the system ROM 80 or a hard disk, for adjustment of the sound volume level. In this case, if user set the pulse width of the sound volume level under the execution of the application program, the application program modifies a value, stored in a specific location of the RTC/CMOS nonvolatile memory module 44 to define the operation of a pin P01 of the keyboard controller module 42. Therefore, the keyboard BIOS of the keyboard controller module 42 reads the modified value from the RTC/CMOS nonvolatile memory module 44 via the interface 73 between the module 42 and the module 44. The keyboard BIOS then changes the current pulse type at the pin P01 according to the contents modified by the application program.

In the microcomputer 40 with the above-described construction according to the present invention, while the system 70 is in its OFF state, all the contents to be recognized by the keyboard controller module 42 are stored in the RTC/CMOS nonvolatile memory module 44. For example, the contents can include the functions set by the user (for example, the STD function, WOL function, STR function, WR function, etc.) Therefore, these functions can be performed even though the system battery voltage and system AC input voltage are removed.

Moreover, in the microcomputer 40 according to the present invention, a variety of selection items or system model identification codes and functions for implementation of various functions in the keyboard controller module 42 are stored in the RTC/CMOS nonvolatile memory module 44. As a result, the preferred embodiments of the microcomputer can be applied to various system models through the use of one keyboard BIOS.

Although the microcomputer of the present invention has been disclosed for illustrative purposes to be provided in a portable system such as a notebook computer, those skilled in the art will readily understand that this invention is also applicable to a fixed system such as a desktop personal computer.

As described above, preferred embodiments of the portable computer system have various advantages. The present invention provides preferred embodiments of a system and microcomputer that is capable of reducing or preventing essential information from being lost due to removal of system voltages or power. A microcomputer according to the preferred embodiments can also be applied to various system models using a single keyboard BIOS.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A portable computer, comprising:
   a system including a CPU;
   a microcomputer coupled to the system by a first interface, wherein the microcomputer comprises,
      a nonvolatile memory module that stores prescribed information, and
      a keyboard controller module that controls a keyboard using a keyboard basic input/output system (BIOS), wherein the keyboard controller module is connected to the nonvolatile memory module by a second interface; and
   a third interface that connects the system to the nonvolatile memory module in the microcomputer, wherein the prescribed information supports each of at least one prescribed functions, and wherein said at least one prescribed functions are different for a plurality of supported model types of the system.

2. The portable computer of claim 1, wherein the prescribed information supports each of a plurality of model types of the system.

3. The portable computer of claim 1, wherein said at least one prescribed functions include at least one of a Save To Disk (STD) function, a Wake-up Ring (WR) function or a Wake-up On LAN (WOL) function.

4. The portable computer of claim 3, wherein when system voltages are off, the at least one prescribed functions of the microcontroller are maintained in the portable computer.

5. The portable computer of claim 4, wherein the at least one prescribed functions are continuously maintained.

6. The portable computer of claim 1, wherein the keyboard controller is configurable to modify information transmitted over the first interface with the system to support each of a plurality of model types of the system.

7. The portable computer of claim 1, wherein the second and third interfaces directly connect the keyboard controller module and the CPU to the nonvolatile memory module, respectively, to exchange data.

8. The portable computer of claim 1, wherein the microcomputer is a keyboard controller, and wherein the portable computer is a notebook computer.

9. The portable computer of claim 1, wherein the nonvolatile memory module stores the prescribed information even when system voltages are removed.

10. The portable computer of claim 1, wherein the keyboard controller module stores the keyboard BIOS, and wherein said prescribed information includes information set by a user and current status information.

11. The portable computer of claim 10, wherein the information set by the user and the current status information can be set using each of the system and the keyboard controller module.

12. The portable computer of claim 11, wherein when system external and battery power are removed, said microcontroller performs said at least one prescribed functions.

13. The system of claim 1, wherein said prescribed information includes prestored information having selection information for the keyboard BIOS to configure the keyboard controller module according to a selected one of a plurality of coupled systems.

14. A microcomputer, comprising:
   a nonvolatile memory module that includes prestored information; and
   a keyboard controller module that performs a control operation of a keyboard with a keyboard basic input/output system (BIOS), wherein said prestored information includes design selection information for designing said keyboard BIOS to correspond to an applied system.

15. The microcomputer of claim 14, wherein said nonvolatile memory module is a real time clock (RTC)/complementary metal-oxide semiconductor (CMOS) type.

16. The microcomputer of claim 14, wherein said nonvolatile memory module and said keyboard controller module are connected with an external system, respectively, via different interfaces.

17. The microcomputer of claim 14, wherein the nonvolatile memory module includes the prestored information even when system voltages are removed, and wherein the microcomputer is a keyboard controller.

18. The microcomputer of claim 14, wherein said prestored information includes function information set by a user and current status information.

19. The microcomputer of claim 18, wherein said function information includes at least one of a Save To Disk function information and a Wake-up Ring function information.

20. The microcomputer of claim 14, wherein said design selection information includes information regarding models of a plurality of systems.

21. The microcomputer of claim 20, wherein said nonvolatile memory module and said keyboard controller module each have respective interface for connection to a system, wherein the nonvolatile memory module includes the prestored information even when system voltages are removed.

22. A method of assembling a notebook computer, comprising:
providing a system with a first microcomputer, a system memory and a main chipset;
providing a keyboard controller with a nonvolatile memory module and a keyboard controller module storing a keyboard basic input output system;
connecting the system to the nonvolatile memory module;
connecting the system to the keyboard controller module; and
storing prescribed information that includes function information set by user and current status information in the nonvolatile memory module, wherein said prescribed information is accessible using the keyboard controller module when system voltages are removed, and wherein said prestored information includes design selection information to configure said keyboard BIOS according to a selected one of a plurality of coupled systems.

23. The method of claim 22, wherein said function information includes at least one of a Save To Disk function information and a Wake-up Ring function information, and wherein said prestored information includes design selection information to configure said keyboard BIOS according to a selected one of a plurality of coupled systems.

24. The method of claim 23, wherein the second and third interfaces directly connect the keyboard controller module and the CPU to the nonvolatile memory module, respectively, to exchange data.

25. A portable computer, comprising:
a system including a CPU;
a microcomputer coupled to the system by a first interface, wherein the microcomputer comprises,
a nonvolatile memory module that stores prestored information, and
a sub-system controller module that controls a sub-system of the portable computer using a sub-system basic input/output system (BIOS), wherein the sub-system controller module is connected to the nonvolatile memory module by a second interface; and
a third interface that connects the system to the nonvolatile memory module in the microcomputer, wherein said prestored information includes selection information for a keyboard BIOS to configure a keyboard controller module according to a selected one of a plurality of coupled systems.

26. A portable computer, comprising:
a system including a CPU;
a microcomputer coupled to the system by a first interface, wherein the microcomputer comprises,
a nonvolatile memory module configured to store prescribed information, and
a keyboard controller module configured to control a keyboard using a keyboard basic input/output system (BIOS), wherein the keyboard controller module is connected to the nonvolatile memory module by a second interface; and
a third interface configured to connect the system to the nonvolatile memory module in the microcomputer, wherein the second and third interfaces directly connect the keyboard controller module and the CPU to the nonvolatile memory module, respectively, to exchange data.

* * * * *